(12) United States Patent
Skeoch et al.

(10) Patent No.: US 8,414,201 B2
(45) Date of Patent: Apr. 9, 2013

(54) SPHERICAL MOUNTING AND POSITIONING SYSTEM

(75) Inventors: James Steven Skeoch, San Diego, CA (US); Jeff Dorsett, Ramona, CA (US); Erich Scott Volkert, Carlsbad, CA (US); Gioia Messinger, Encinitas, CA (US)

(73) Assignee: AVAAK, Inc., San Diego, CA (US)

( * ) Notice: Subject to any disclaimer, the term of this patent is extended or adjusted under 35 U.S.C. 154(b) by 0 days.

(21) Appl. No.: 13/350,333

(22) Filed: Jan. 13, 2012

(65) Prior Publication Data

US 2012/0114324 A1  May 10, 2012

Related U.S. Application Data

(63) Continuation-in-part of application No. 12/023,866, filed on Jan. 31, 2008, now abandoned, and a continuation-in-part of application No. 29/404,962, filed on Oct. 27, 2011, and a continuation-in-part of application No. 29/404,964, filed on Oct. 27, 2011, now Pat. No. Des. 677,709.

(51) Int. Cl.
*G03B 17/00* (2006.01)

(52) U.S. Cl.
USPC .......................................... 396/419; 396/428

(58) Field of Classification Search .................. 396/419, 396/427, 428; 348/373–376; 248/206.5, 248/346.01
See application file for complete search history.

(56) References Cited

U.S. PATENT DOCUMENTS

| | | | | |
|---|---|---|---|---|
| 2004/0048507 A1* | 3/2004 | Hage | .............................. | 439/332 |
| 2005/0247845 A1* | 11/2005 | Li et al. | ....................... | 248/346.5 |

* cited by examiner

*Primary Examiner* — W B Perkey
*Assistant Examiner* — Minh Phan
(74) *Attorney, Agent, or Firm* — Manuel de la Cerra

(57) ABSTRACT

Disclosed herein is an enhanced magnetic directional mount for mounting, positioning, and orienting an electronic device such as a camera. In this enhanced mount, the base mounting surface is configured to maximize the extent of adjustment and ease of adjustability of the electronic device, and the base mounting surface and housing mounting surface are designed to provide smooth and secure movement in the electronic device position. Additionally, the enhanced magnetic mount includes attachments designed to affix the magnetic mount to a horizontal or vertical flat surface such as a desk or a wall, and an attachment designed to effectively mount and use the electronic device from a window.

11 Claims, 5 Drawing Sheets

SPHERICAL MOUNTING AND POSITIONING SYSTEM

FIELD OF THE INVENTION

This invention relates to a mechanical device for mounting and positioning directionally sensitive apparatus. In an embodiment, the device is constructed for holding and positioning a small camera.

BACKGROUND

The field of remote image capture is growing rapidly. Remote image capture has been found to be useful in security applications, as well as for monitoring environmental, commercial, and industrial processes. In a typical remote imaging application, cameras are mounted in strategic positions in an area, and the cameras communicate image or video data to a central monitoring station. In one example, the remote imager is an Internet camera that communicates image data to a computer attached to the Internet. In another example, the remote imagers are miniature cameras that communicate on a private network. One such camera and camera network is described in U.S. Pat. No. 7,507,946, issued Mar. 24, 2009, which is hereby incorporated by reference. It will be understood that many other different types of sensors, imagers, and cameras may be used in a remote imaging application.

In setting up a remote monitoring system, each camera is usually mounted to a stable support surface, with the camera's imager being directed toward an area of interest. To facilitate a more flexible installation, cameras are often mounted using a ball-and-joint or universal camera bracket. In using such a bracket, each camera is usually screwed or bolted to a first part of the bracket, and then the first part of the bracket is frictionally engaged to a second part of the bracket. In this way, initially attaching a camera to a bracket often requires the use of tools, and can be a time consuming and cumbersome process. For example, the camera is easily dropped and damaged during the installation process. In a similar manner, removing a camera from its mounting bracket suffers from the same deficiencies. After installation, these brackets allow the camera to be tilted and panned to a particular position, and then a mechanical locking mechanism secures the camera into that position. If the camera positioning needs to be adjusted, the locking mechanism is loosened, the camera is repositioned, and then the locking mechanism is tightened. In this way, repositioning cameras can also be a time consuming and cumbersome process. In addition, the locking mechanism or the ball-and-joint structure may interfere with positioning, thereby limiting how the camera can be positioned.

Magnetic directional mounts have been disclosed, for example in US Publication No. 2005/0247345 by Li et al, generally configured similarly to the ball and joint bracket, but magnetically held. This configuration lacks ease and smoothness of adjustability of the mounted electronic device, and provides a relatively small area of magnetic field.

US Patent publication No US-2009-0196597-A1, published Aug. 6, 2009 discloses a magnetic directional mount for mounting, positioning, and orienting an electronic device. US patent publication No US-2009-0196597-A1 is hereby incorporated by reference in its entirety. It discloses a housing for the electronic device that has a generally concave housing mounting surface, with a magnet positioned inside the housing and adjacent to the housing mounting surface. A base part has a base mounting surface that is constructed to be attracted to the magnet. The base part is mounted to a stable support. In the example cited and illustrated in the figures, the base mounting surface is dome-shaped, and in particular a hemispherical dome.

SUMMARY

Disclosed herein is an enhanced magnetic directional mount for mounting, positioning, and orienting an electronic device such as a camera. In this enhanced mount, the base mounting surface is configured to maximize the extent of adjustment and ease of adjustability of the electronic device, and the base mounting surface and housing mounting surface are designed to provide smooth and secure movement in the electronic device position. Additionally, the enhanced magnetic mount includes attachments designed to affix the magnetic mount to a horizontal or vertical flat surface such as a desk or a wall, and an attachment designed to effectively mount and use the electronic device from a window or other non-porous surface.

DETAILED DESCRIPTION

Figure 1A:
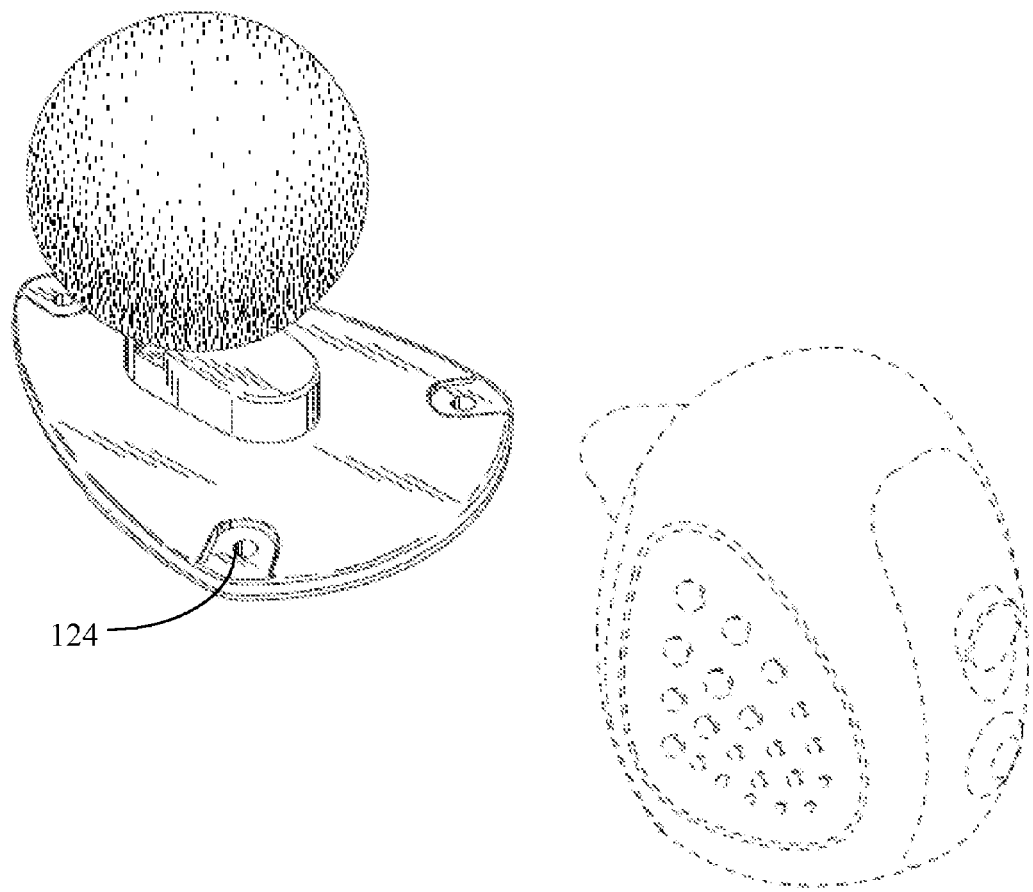
FIG. 1a is a perspective view of a first embodiment of the inventive mount system, with an electronic device unattached.
Figure 1B:
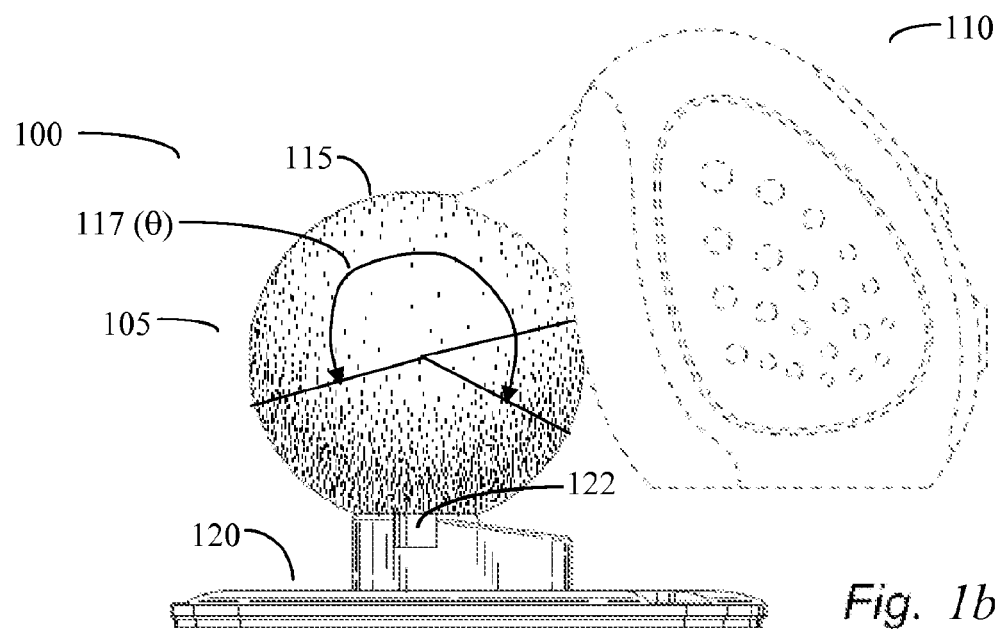
FIG. 1b is a side view of the embodiment of FIG. 1, with an electronic device attached.
Figure 1C:
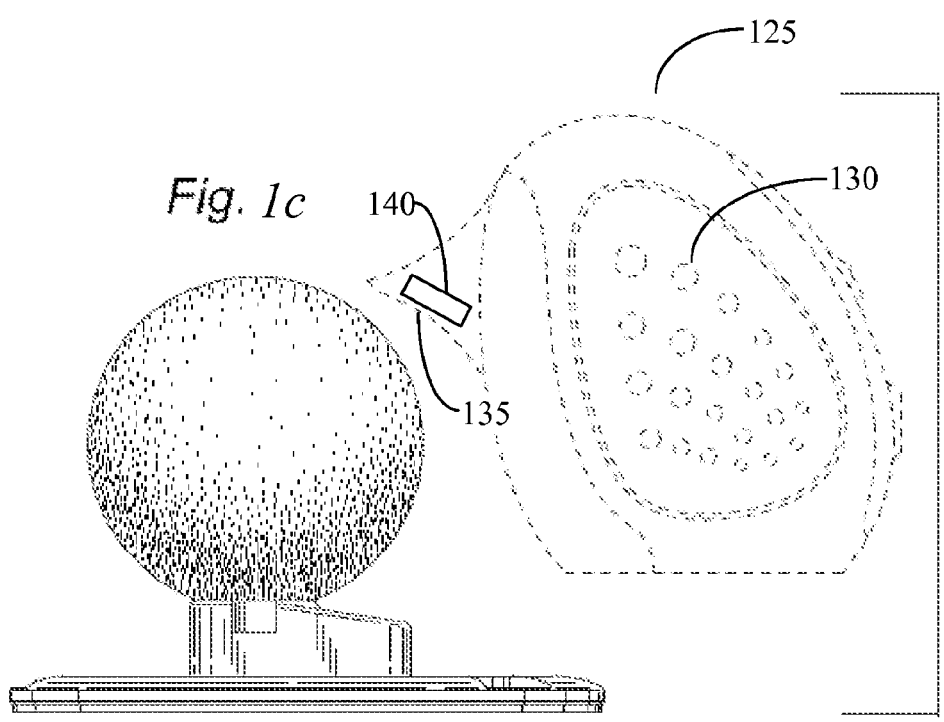
FIG. 1c is a side view of the embodiment of FIG. 1, with an electronic device unattached.

FIGS. 1a-1c illustrate a first embodiment of an enhanced magnetic directional mount system. FIG. 1a is a perspective view with an electronic device unattached, FIG. 1b is a side view with an electronic device attached, and FIG. 1c is a side view of the mount system with an electronic device unattached. The mount system in this figure is shown in the form of a camera mount, but it will be appreciated that other types of mounts may be constructed. For example, the directional mount may be used for other types of image or video sensors, or may be used to mount directionally sensitive electronic devices such as microwave, satellite, or RF antennas. Camera mount system 100 comprises a base portion 105 and a cooperating camera portion 110. Base portion 105 has a convex base mounting surface 115 attached to a mounting base 120. In the embodiment illustrated, a peg 122 connects portion 115 to mounting base 120 which is a planar mount for affixing to a desk or wall. Mounting base 120 is constructed to be securely attached to a stable flat horizontal or vertical surface such as a wall, desk, or other fixed object. Mounting base 120 may be adhesively or mechanically attached to the stable support, and may be permanently or removably fixed. In the embodiment illustrated, mounting base 120 includes openings 124 through which screws may be inserted to attach mounting base 120 to a horizontal or vertical flat surface.

In the embodiment illustrated, base mounting surface 115 is a convex surface in the shape of a substantially complete sphere. This shape allows for maximum movement and adjustability of camera portion 110. Having the surface 115 be a complete or nearly complete sphere allows the camera position to sweep across a range greater than 180 degrees both vertically and horizontally. The approximate extent 117 of the vertical sweep angle θ (wherein θ is defined relative to a horizontal mounting surface) is indicated on FIG. 1b, and the horizontal sweep angle may be 360 degrees if there are no external interruptions. It will be appreciated that the size and exact shape of the sphere may be adjusted according to specific mounting and directional requirements. Typically, the sphere will have a substantially smooth surface, although protrusions may be added for providing particular stop positions. The sphere may have a slightly tacky surface or other type of surface designed to provide some physical (as opposed to magnetic) friction with the mounting surface of the camera portion. The slight friction, sufficient to prevent the camera from sliding relative to the base, allows finer adjustment of the camera position than would be the case for a substantially frictionless coupling. In an embodiment, the sphere 115 is typically constructed of a material that is attracted by magnetic force, such as a ferrous or metallic material. The sphere may be entirely constructed of such magnetic material, or it may have a coating or layer on its inner or outer surface for providing such attraction. It will also be appreciated that sphere 115 and mounting base 120 may be integrally formed, or may be made of separate pieces.

The camera portion 110 includes a camera, and may have a camera housing 125 for holding an image sensor 130 and supporting electronic and communication circuitry. Also, the housing 125 may hold a battery for providing power for sensor 130 and the electronic circuitry. Housing 125 includes a concave portion 135 called the "housing mounting surface". Housing mounting surface 135 is shaped and sized to cooperatively mate with the surface 115 of the sphere. The housing mounting surface has a length that extends a substantial portion of the length of one side of the housing. Note that surface 115 of the sphere is considerably larger than housing mounting surface 135, which increases the area of the magnetic field, and also provides for smooth movement of the camera across the sphere, and makes it less likely for the camera to be knocked off the sphere during positioning. A magnet 140 is mounted in the housing adjacent to or near mounting surface 135. It will be appreciated that magnet 140 may be a button magnet, strip magnet, or other shaped magnetic device. Although magnet 140 is contemplated to be a permanent magnet, in some cases an electromagnet or other temporary magnet may also be used. Alternatively, the magnet may be positioned in the base portion and the housing mounting surface may be constructed of a material that is attracted by magnetic force. Alternatively, there may be magnets in both the base portion and the housing portion. Although the various alternative positions of the magnet are possible, the preferred magnet position is in the housing, since the housing mounting surface is much smaller than the base mounting surface, and therefore only a small region of high magnetic field is required if the magnet is in the housing.

To position and orient a camera, base portion 105 is securely attached to a stable surface such as a desk or a wall. The camera portion 110 is brought near to base portion 105, so that surface 115 of the sphere is brought into contact with housing mounting surface 135 as illustrated in FIG. 1c. In this arrangement, the magnet acts to pull housing mounting surface 135 toward surface 115 of the sphere, since in the embodiment shown, surface 115 is attracted by magnetic force. Magnet 140 is large enough and powerful enough to hold camera 110 securely to surface 115. However, due to the complementary shapes of the sphere and the housing mounting surface 135, the camera is continuously adjustable, i.e., may be moved into an infinite number of positions relative to the sphere.

In this way, camera mount system 100 provides a universal positioning mechanism for camera 110. Camera 110 may be easily attached or detached from base part 105. Camera 110 may be easily and smoothly adjusted for optimum positioning and orientation. Because camera mount system 100 has no ball or joint structure, camera 110 may be freely moved into any position on the sphere.

Figure 2A:
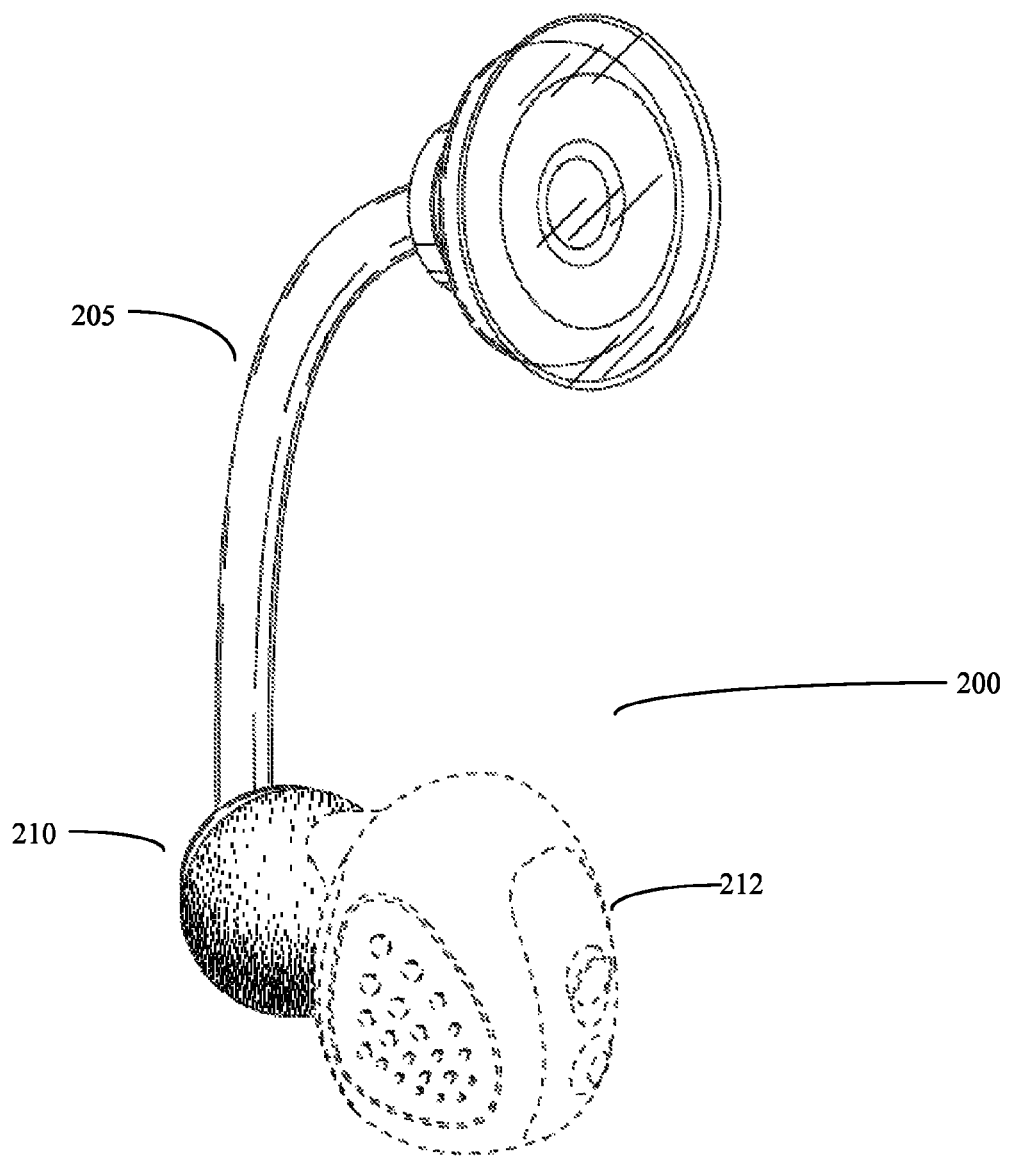
FIG. 2a is a perspective front view of a second embodiment of the inventive mount system, with an electronic device attached.
Figure 2B:
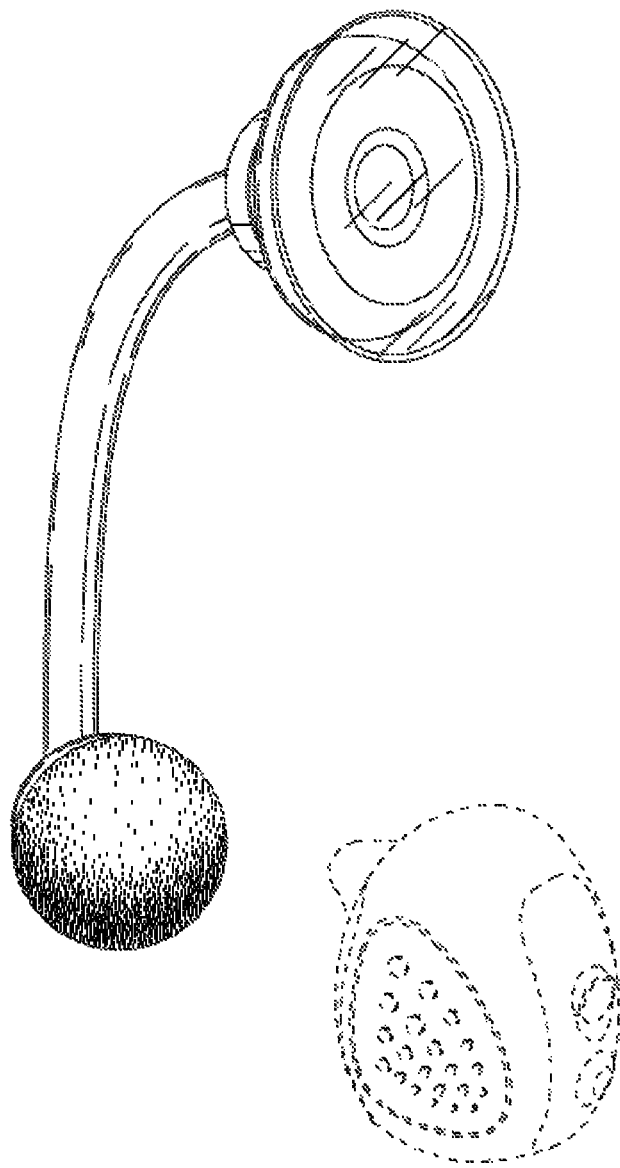
FIG. 2b is a perspective front view of the embodiment of FIG. 2a, with the electronic device unattached.
Figure 2C:
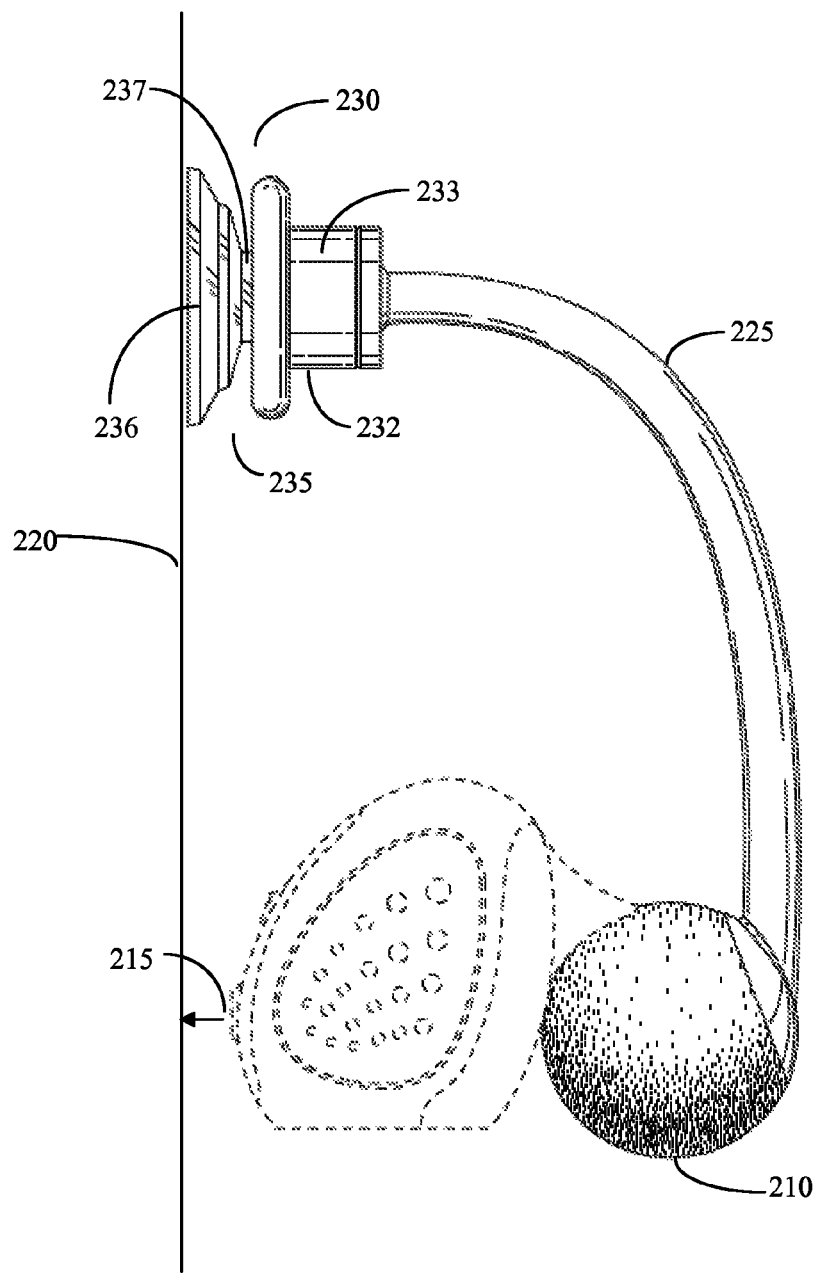
FIG. 2c is a side view of the embodiment of FIG. 2a, with an electronic device attached.

FIGS. 2a-2c illustrate a second embodiment of an enhanced magnetic directional mount system 200. FIG. 2a is a perspective front view of the electronic device mount with an electronic device attached, FIG. 2b is a perspective front view with the electronic device unattached, and FIG. 2c is a side view with an electronic device attached.

Note that this second embodiment of the enhanced magnetic directional mount system includes base portion 205 with spherical base mounting surface 210 for mounting an electronic device thereon. The embodiment is illustrated with a camera device 212, although the directional mount may be used for other types of image or video sensors. Spherical base mounting surface 210 is substantially similar to surface 115 of the first embodiment, and the positioning and mounting of an electronic device on the spherical base mounting surface is substantially the same as for the first embodiment. However, the second embodiment is configured for mounting on a window or other non-porous surface. It includes a suction cup for attaching the directional mount to the non-porous surface, and includes an arm which may be curved connecting the suction cup to the magnetic mounting surface. When used against a glass surface, it is designed to position an electronic device such as a camera relative to the window glass to achieve one of several goals: A first possible configuration places the camera in a position far enough from the glass to minimize glare from the window. This may be accomplished, for example, by positioning the camera below the window glass. A second possible configuration places the camera lens touching the window glass to minimize reflected images while pointing the camera through the window. This configuration is illustrated in FIG. 2c, where lens 215 touches window glass 220. Other potential uses of this embodiment include: a) using a smooth desk top as the surface to which the directional mount is attached, and using the curved arm to place the camera at a more appropriate height, and b) attaching the directional mount to a computer screen or computer screen casing, allowing for greater adjustability than is provided in currently available devices.

In this embodiment, base portion 205 includes rigid curved arm 225 attaching sphere 210 to suction cup assembly 230. Suction cup assembly 230 may comprise a suction cup connector 232 attached to arm 225, having an orifice 233 therein. Suction cup 235 may comprise a suction disk portion 236 attached to slightly flexible connecting protrusion 237. Connecting protrusion 237 is firmly mated to orifice 233, thereby attaching arm 225 and suction cup connector 232 to suction cup 235. Base portion 205 is affixed to window glass 220 by firmly pressing suction cup 235 to glass 220. In this embodiment, base portion 205 is positioned below suction cup 235. In one configuration, a camera is magnetically held against sphere 210 in a position such that camera lens 215 touches window glass 220. In this configuration, the curvature of arm 225 is designed according to the dimensions of camera 212 to result in the positioning of camera lens 215 against window 220. Due to the slight flexibility of connecting protrusion 237, suction cup assembly 230 may be designed to enable some rotation of arm 225 relative to suction cup 235 while maintaining suction. This allows for slight deviations from the exact curvature of arm 225, while still positioning the camera lens 215 against window glass 220. For the embodiment described where base portion 205 is positioned below suction cup 235, gravitational force tends to urge the camera lens into position against the window glass.

In an embodiment, arm 225 attaching sphere 210 to suction cup assembly 230 may be semi-rigid. The term semi-rigid as applied to arm 225 is defined herein as arm 225 being movable into different positions, and stable enough to hold the position. Having a semi-rigid arm 225 would enable optimizing the position of the camera, e.g., adjusting the distance from the glass to minimize glare.

In an alternate configuration, the camera is placed against sphere 210 in a position such that the lens 215 faces into the room. For this configuration, the suction cup 235 may be placed such that the camera at the end of arm 225 is positioned off the window glass, and far enough from the glass to minimize glare from the window.

It is not expected that the invention be constrained to the exact embodiments disclosed herein. Those skilled in the art will recognize that changes and modifications can be made without departing from the inventive concept. For example, the electronic device is not constrained to be a camera. Other types of image or video sensors may be used, or directionally sensitive electronic devices such as microwave, satellite, or RF antennas. The scope of the invention should be construed in view of the claims.

The invention is claimed is:

1. A magnetic directional mount system for an electronic device comprising:
  a. a housing for the electronic device, having an elongated and generally concave housing mounting surface having a length that extends a substantial portion of a length of one side of the housing;
  b. a base comprising a substantially spherical base mounting surface, said base mounting surface being larger than said housing mounting surface;
  c. a magnet positioned adjacent to a first of: the housing mounting surface and the base mounting surface, wherein said housing mounting surface and said base mounting surface being attracted to said magnet;
  d. an attachment member on the base for attaching the base to a planar support surface;
  e. wherein said housing mounting surface and said spherical mounting surface are configured to cooperatively mate with and fit each other, and wherein the magnet couples the housing to the base when the housing mounting surface is adjacent to and fitting to the base mounting surface;
  f. wherein the mount system is configured such that the position of said electronic device and housing relative to said base is adjustable over a vertical angular range greater than 180 degrees, and is adjustable over a horizontal angular range greater than 180 degrees.

2. The magnetic directional mount system of claim 1, wherein said base mounting surface and said housing mounting surface are configured to provide continuous adjustability of position of said electronic device and housing relative to said base.

3. The magnetic directional mount system of claim 1, wherein said base mounting surface provides sufficient physical friction with the housing mounting surface to prevent the electronic device from sliding relative to the base and to allow fine adjustment of the electronic device.

4. The magnetic directional mount system of claim 1, wherein said attachment member on the base for attaching the base to a planar support surface comprises a planar base bottom for mounting on a vertical or horizontal planar surface.

5. The magnetic directional mount system of claim 4, wherein said planar base bottom has a plurality of openings therethrough for attaching said planar base bottom to said vertical or horizontal planar surface.

6. The magnetic directional mount system of claim 1, wherein said housing mounting surface and said base mounting surface is substantially comprised of a magnet attracting material.

7. The magnetic directional mount system of claim 1, wherein said housing mounting surface and said base mounting surface has a coating or a layer of the magnet attracting material.

8. The magnetic directional mount system of claim 1, wherein said housing mounting surface and said base mounting surface is constructed from a magnetic metal.

9. The magnetic directional mount system of claim 1, wherein said electronic device is a miniature camera.

10. The magnetic directional mount system of claim 1, further comprising an electronic device mounted in said housing.

11. A camera mount system for a miniature camera, comprising:
  a) a miniature camera mounted in a housing, said housing having an elongated and generally concave housing mounting surface having a length that extends a substantial portion of a length of one side of the housing;
  b) a magnet in the housing positioned adjacent to the housing mounting surface;
  c) a base comprising a substantially spherical base mounting surface that is attracted to the magnet, said base mounting surface being larger than said housing mounting surface;
  d) an attachment member on the base for attaching the base to a planar support surface;
  e) wherein said housing mounting surface and said spherical mounting surface are configured to cooperatively mate with and fit each other, and wherein the magnet couples the housing to the base when the housing mounting surface is adjacent to and fitting to the base mounting surface;
  f) wherein the mount system is configured such that the position of said electronic device and housing relative to said base is adjustable over a vertical angular range greater than 180 degrees and is adjustable over a horizontal angular range greater than 180 degrees.

* * * * *